June 21, 1927.
F. LÖSEL
1,632,907
HIGH PRESSURE STEAM TURBINE AND METHOD OF UTILIZING HIGH PRESSURE STEAM THEREIN
Original Filed Aug. 13, 1924    2 Sheets-Sheet 1
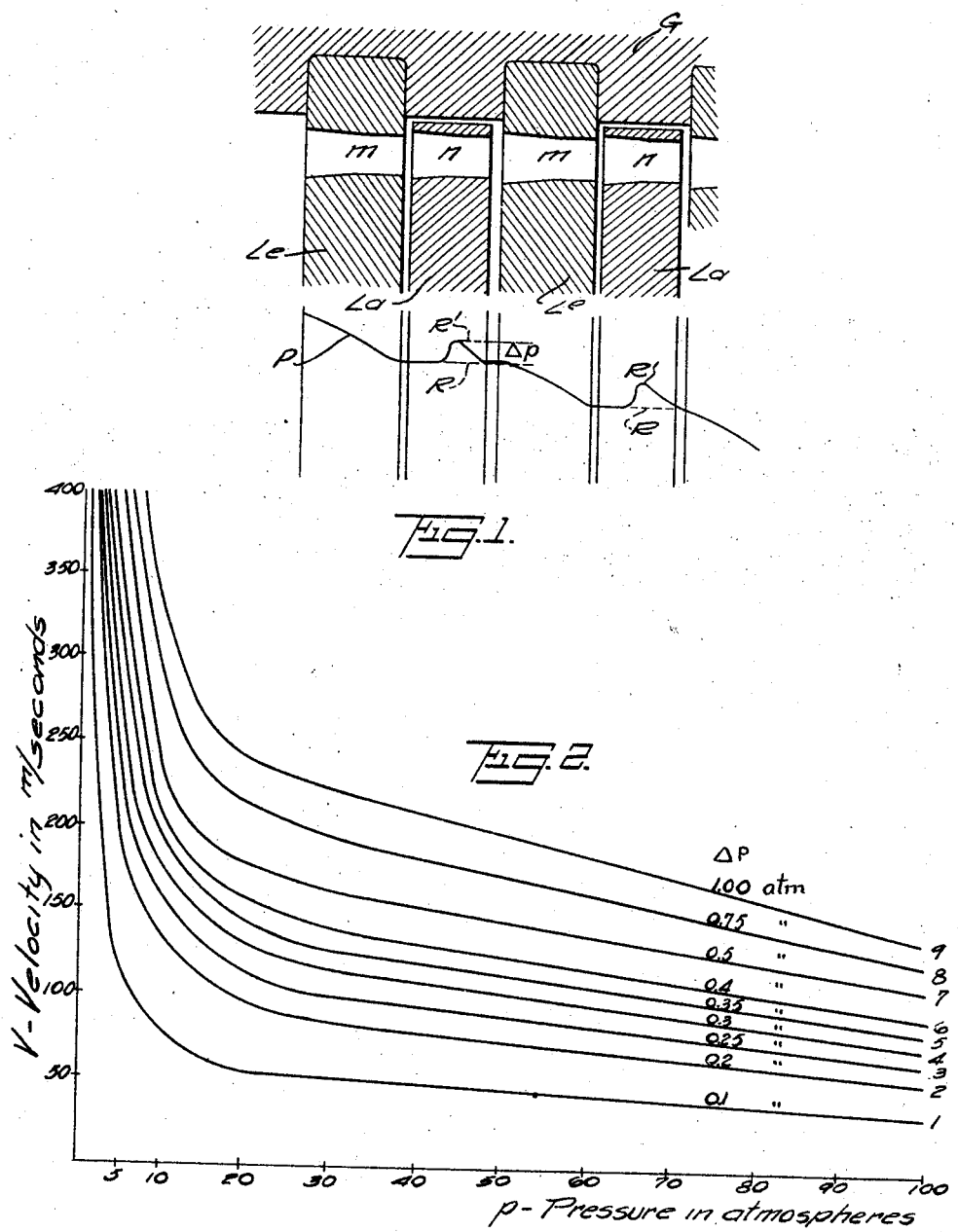

June 21, 1927.  1,632,907
F. LÖSEL
HIGH PRESSURE STEAM TURBINE AND METHOD OF UTILIZING HIGH
PRESSURE STEAM THEREIN
Original Filed Aug. 13, 1924   2 Sheets-Sheet 2
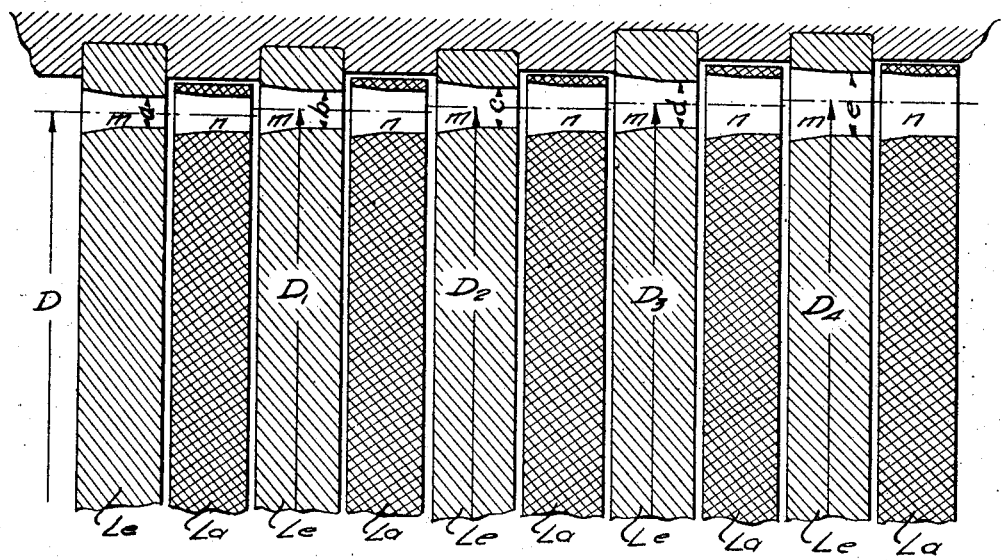
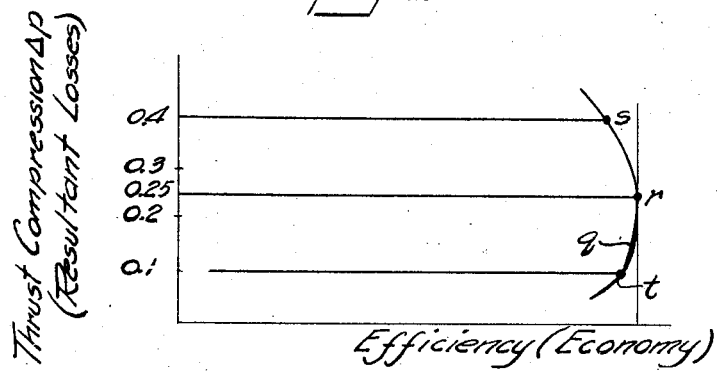
INVENTOR
Franz Lösel
BY Richard Eyre
ATTORNEY Patented June 21, 1927.

1,632,907

UNITED STATES PATENT OFFICE.

FRANZ LÖSEL, OF BRUNN, CZECHOSLOVAKIA.

HIGH-PRESSURE STEAM TURBINE AND METHOD OF UTILIZING HIGH-PRESSURE STEAM THEREIN.

Continuation of application Serial No. 731,722, filed August 13, 1924, and in Denmark March 3, 1924. This application filed May 19, 1925. Serial No. 31,463.

The invention relates to high or back pressure turbines of the elastic fluid type, particularly turbines of the disc wheel type, and especially steam turbines for very high pressures, as for example admission pressures of from 30 to 100 atmospheres or higher.

This is a continuation of my application Serial No. 731,722, filed August 13, 1924.

While it has long been recognized that steam may be generated most economically at the higher pressures, prior turbines have been ill adapted to the use of very high pressures, because the increased losses incident to the high pressure operation of these prior structures neutralize in substantial part the economy which may be effected by the high pressure generation.

The invention contemplates a turbine capable of utilizing such high pressure steam at substantially better efficiencies than prior turbines and resides in the application of certain novel principles of construction and operation to turbines to that end. The invention also contemplates a turbine into which these principles may be economically and practically embodied.

My invention relates more particularly to a turbine of the character set forth in my Letters Patent #1,494,850, May 20, 1924, wherein the operating steam velocities are kept within the low velocity zone discovered by me to be peculiarly efficient as compared with the higher velocity zones of prior turbines. Experience has shown that turbines of this type when designed for very high pressures have not had as high an efficiency as at lower pressures. I have discovered that this is not necessarily due, as generally supposed, mainly to wheel friction and ventilation losses, but that the losses incident to thrust compression in the rotating blade canals, which are negligible at low pressures at any relative steam velocity practical for low pressure operation, disproportionately increase at high pressures and correspondingly high densities and seriously reduce the working output. The thrust compression (and incident losses here dealt with) is that due to the alteration of direction of flow through the rotating canals and to the alteration of the canal sections, and is a function of the density (or working pressure) and the velocity of flow and increases therewith at the higher pressures and densities. These losses include the energy loss in the compression and expansion, the internal and hydraulic losses of the fluid flow, the enhanced leakage losses, and probably others directly or indirectly due to the thrust interference with the normal and regular flow and expansion of the high density steam. I have found, however, that such losses and impairment in efficiency may be substantially reduced by constructing the high pressure portions of the turbine for operation at substantially lower relative steam velocities than would be practicable in the lower pressure parts of the turbine. While, however, relative steam velocities must be relatively lowered in the higher pressure zone of the turbine for good efficiency, there is a critical range in velocities below which one must not go in constructing the turbine, otherwise the gain in reduction of thrust compression losses is offset by other considerations. It is not only necessary, therefore, that the comparatively low relative steam velocity, as set forth in the above referred to Letters Patent, should exist throughout the turbine for good efficiency, but taking into consideration the thrust compression and losses incident thereto in the higher pressure zones and that the multiplication of the stages in the very high pressure zones does not materially or substantially add to the cost, weight and size of the turbine, it is essential for best performance in these very high pressure turbines here contemplated that they be constructed for operation at relative steam velocities substantially lower than are found necessary for the lower pressures. The velocity must be selected and chosen for each turbine part, and the latter accordingly constructed and proportioned, such as to keep and maintain the thrust compression within the permissible limits or zone representing best or maximum efficiency, and economy and practicable embodiment of these principles must also be taken into consideration. My invention, therefore, resides in a high pressure turbine having its stationary and rotating canals constructed and proportioned in accordance with these principles and to the ends that the thrust compression losses do not exceed the predetermined practicably permissible value in any stage or stage group throughout the high pressure part of the turbine and that the elastic fluid velocities and thrust compressions throughout the turbine shall come within the limits or zone found by me to give satisfactory performance notwithstanding the high pressure operation.

I have obtained data showing the relation between the thrust compression and relative velocity at various pressures within the high pressure zone here under consideration, and these data afford a ready guide means for properly proportioning the turbine canals and parts to obtain the substantially thrustless expansion of the steam throughout the high pressure zone. If desired, the parts may be so proportioned as to obtain a substantially constant and uniform thrust compression value throughout the various stages of the rotating turbine elements and within the critical range discovered by me to have the maximum efficiency, although in practice it will be usually sufficient to have the thrust compression within this critical range without the necessity of a constant uniform thrust compression throughout the high pressure zone. I thus secure a practical high pressure turbine in which the losses due to compression thrusts are reduced to within practicable limits, even within the highest pressure stages, and which is therefore capable of operation at an efficiency not unduly impaired by the usual thrust losses and whose output is more nearly proportional to the large heat and pressure drops available at the higher heat and pressure heads.

For a better understanding of my invention, reference may be had to the accompanying drawings forming a part of this application, of which:

Fig. 1 shows more or less diagrammatically a partial longitudinal section through a disc wheel turbine with a pressure curve, Fig. 2 illustrates a series of thrust compression curves, Fig. 3 is a partial longitudinal sectional view through a disc wheel turbine embodying my invention, and Fig. 4 shows an efficiency and economy curve in the high pressure zone.

Referring to Fig. 1 the diaphragms of a disc wheel turbine are indicated by L$e$ and the rotating wheels by L$a$. The stationary guide nozzles are indicated by $m$ and the rotating canals or steam passages of the rotating wheels are indicated at $n$. G indicates generally a turbine casing or a body for carrying the diaphragms L$e$ and enclosing the rotating wheels L$a$. The curve P indicates generally the fall of pressure of the steam or other elastic fluid as it passes through the turbine. The pressure takes a relatively small drop in passing through the stationary guide nozzles $m$, but should not increase by passing through the rotating canals $n$. The pressure theoretically should have a substantially constant value in impulse turbines or in certain cases a decreasing value, if there is a certain reaction degree, while passing through the rotating canals $n$ of the rotating wheels. The pressure curve P is shown for an impulse turbine. The dotted lines R connecting the horizontal portions of the curve P indicate the theoretically constant value of the pressure while passing through the rotating chambers or canals $n$ and the humps R′ in the curve above these dotted portions indicate the increases in pressure $\Delta p$ of the elastic fluid due to the compressive thrusts of the elastic fluid when its direction is altered in passing through a canal $n$ or it is passing through an altered passage or reduced section. These compressive thrusts, resulting in the compression of the elastic fluid within the rotating wheels and indicated by the irregularities R′ in the expansion curve P, disturb the expansive working of the elastic fluid and impair the efficiency of the turbine. I have found by actual tests that the losses due to these thrust compressions, while negligible at the lower pressures and densities, become relatively of increasing importance at the higher pressures and densities and for best turbine performance must be taken into consideration in constructing a turbine for these very high pressures. I have referred particularly to the thrust compression and incident losses occurring in the rotating canals because such losses are the principal thrust losses, though of course there is a slight thrust compression loss in the stationary nozzles which is also substantially reduced by my invention.

In Fig. 2 is illustrated a series of thrust compression curves plotted between pressures and relative velocities, each corresponding to a substantially constant thrust compression throughout the turbine and based upon the data empirically determined. These curves show the influence of steam pressure $p$ (density) and relative steam velocity $v$ on the thrust compression $\Delta p$. Curve 1 shows the local increase of pressure $\Delta p$ of 0.1 atm. within the canals; curve 2, $\Delta p = 0.2$ atm.; curve 3, $\Delta p = 0.25$ atm.; curve 4, $\Delta p=0.3$ atm.; curve 5, $\Delta p=0.35$ atm.; curve 6, $\Delta p=0.4$ atm.; curve 7, $\Delta p=0.5$ atm.; curve 8, $\Delta p=0.75$ atm.; and curve 9, $\Delta p=1$ atm. Assuming a relative velocity of 150 meters, there is for instance a pressure or density increase due to thrust compression of 0.1 atm. at a pressure of 3 atmospheres of the working fluid; an increase of 0.2 atm. at 7 atm.; of 0.3 atm. at 12 atm.; and there would be a $\Delta p$ of 1 atm. at 86 atm. These curves show that with an equal or increasing relative steam velocity the thrust compressions are increasing considerably in the high pressure stages of the turbine part. The losses due to these compressions disproportionately increase at the very high pressures and are unduly large in prior high pressure turbines, resulting in useful outputs which are not proportional to the larger heat (pressure) drop available at the higher pressure (heat) head.

According to this invention the high pressure turbine or the high pressure part of a turbine is to be so constructed that the expansion in the highest pressure zone occurs in a practically thrustless manner, that is, the relative velocities of the working fluid at these high pressures while permitted to vary from the high pressure part towards the low pressure part, are kept within such limits that the compression thrusts do not surpass the upper practically permitted value throughout the whole high pressure zone of the turbine, and that the steam velocities are kept above the lower practicable limits. The critical range and approximate limits in terms of efficiency, economy and actual thrust compressions are generally indicated in Fig. 4 wherein the curve $q$ is plotted between thrust compressions and efficiency (economy). This curve shows that the efficiency of the turbine begins to decrease rapidly as the thrust compression goes above 0.35 atm. and approaches 0.4 atm., indicating a marked increase in the thrust compression losses at these points, while at about 0.25 atm. the efficiency and economy appear as a maximum (point $r$). If steam velocities are chosen so as to give thrust compressions below 0.25 atm. the efficiency and economy while not decreasing rapidly at first, begin to show a marked drop in the neighborhood of 0.1 atm. (point $t$) which indicates that the gain in reduction of thrust losses by lowering the velocity and thrust compression to this extent is offset by increased losses in other directions. Moreover, constructional problems and costs determine generally that the velocities shall not be lower than those corresponding to the thrust compressions approximating 0.1 atmosphere. The lower practicable limit therefore for the velocity in any high pressure stage is that corresponding to a thrust compression of approximately 0.1 atm. while the upper limit of thrust compression is in the neighborhood of 0.4 atm. Higher thrust compressions than the latter result in substantial losses including the energy compression-expansion loss and internal hydraulic loss of the expanding and working fluid flow, that due to the resultant damming up and retarding and interference with or opposition to the normal steam expansion, a perhaps slight increase in the friction, windage and centrifugal losses, and the increased peripheral leakage losses, aggravated by the very high steam density and very small specific volume of the high pressure steam here under consideration. The best and most favorable range is that in the neighborhood of a thrust compression of 0.25 atm. but departures therefrom may be made in certain cases to meet the practical requirements, though generally the upper and lower limits 0.4 atm. and 0.1 atm. respectively should not be disregarded, if highest efficiency in each stage and best turbine economy are to be secured. The relative velocities for the different high pressure zones of the turbine should be chosen in accordance therewith. It is observed from the economy curve of Fig. 4 that the efficiency decreases more rapidly as the thrust compression is increased above the point $r$ than it does with a decrease of the compression below the point $r$, indicating that the zone below $r$ is generally more favorable to efficiency than the zone above.

With the data and constant thrust compression curves of Fig. 2 as a guide, supplemented by the critical range and limits generally indicated in Fig. 4, the guide nozzles and canals and turbine parts may be proportioned and constructed for each turbine stage so as to obtain the best and most favorable performance. The latter is obtained when the velocities and thrust compressions are kept within the limits above defined. In accordance with this invention there will be a general or average increase of the relative steam velocities from the high pressure end toward the lower pressure end, although for practical reasons, it may not be desirable to construct the turbine for a progressive increase in velocities from stage to stage, it being generally sufficient that different successive zones or stage groups should be designed and constructed with these limits in view. The thrust compression curves themselves may afford the guides for selecting the proper relative steam velocity for each stage or stage group, or the formulæ corresponding thereto may be utilized for this purpose. For example, if the turbine is to be constructed for a thrust compression of 0.25 atm. (indicated as the most favorable) throughout the high pressure part of the turbine, then the formula $$v = 114 - \frac{48p}{100}$$

may be utilized in the pressure zone between 30 and 100 atmospheres, wherein $p$ is the pressure in atmospheres absolute and $v$ is the relative steam velocity in meters per second. Similarly there is a definite formula corresponding to each of the other constant thrust compression curves. For example, the formula for $\Delta p = 0.4$ atm. is $$v = 159 - \frac{64p}{100}$$

in the pressure zone between 30 and 100 atmospheres and the formula for $\Delta p = 0.1$ atm. is $$v = 59 - \frac{27p}{100}.$$

These formulæ and the constant thrust compression curves are determined from actual test data.

The thrust compression curves of Fig. 2 indicate the increasing importance towards the high pressure end of the turbine of the proper and careful construction of the turbine parts with reference to the fluid velocities. For example, the constant thrust compression curves are observed to become more closely crowded together with the increase of pressure, showing that a variation in fluid velocity in the high pressure part of the turbine has a substantially greater effect on the thrust compression and incident losses than the same or equal variation has in the lower pressure part of the turbine. These constant thrust compression curves and formulae determine the most favorable and permissible relative velocities for each pressure and in each part of the turbine and the turbine construction is determined thereby.

I have indicated more or less diagrammatically in Fig. 3 my invention embodied, as for example, in a disc wheel turbine, wherein the heights of the orifices of the consecutive guide canals $m$ are represented by $a, b, c, d, e$ and the medium pitch or average diameters thereof by $D, D_1, D_2, D_3, D_4$. The products $a \times D, b \times D_1, c \times D_2, d \times D_3, e \times D_4$, etc. may be considered as the respective measures of the exit sections for a full admission turbine, since the length of a ring of orifices is proportional to the average diameter. The relative areas of the consecutive guide blade exit sections, of which these products are the respective measures, determine the absolute velocity in the respective stages, and in a practical turbine embodying my invention, the ratio of such consecutive stationary guide nozzle exit sections have a predetermined relation to each other. The diameters $D_1, D_2,$ etc. of the stages and the number of revolutions determine the peripheral speed of the rotating canals. The thrust compression curves corresponding to the practically thrustless expansion, as above defined, throughout the high pressure part of the turbine, are based upon guide nozzle constructions such that the ratio of a guide blade exit section to the next preceding exit section is less than 1 (unity) but not substantially less than 0.99 times the value of the ratio of the next preceding exit section to it, and for most favorable conditions and operation this value should be approximately 0.997. These ratios may be expressed as follows:

$$\frac{b \times D_1}{a \times D} = 0.997 \times \frac{c \times D_2}{b \times D_1};$$

$$\frac{c \times D_2}{b \times D_1} = 0.997 \times \frac{d \times D_3}{c \times D_2};$$

$$\frac{d \times D_3}{c \times D_2} = 0.997 \times \frac{e \times D_4}{d \times D_3}$$

But for partial admission turbines the length of the admission arc is less than a circle and the formulæ must be varied accordingly, as for example by introducing proportionate factors to correct for the partial circular admissions or by substituting for $D, D_1, D_2,$ etc. the actual arc lengths. By constructing the turbine according to these formulæ so as to embody relative exit sections throughout of the proportions defined thereby, a substantially constant thrust compression of practically negligible or harmless value exists throughout the turbine parts but as above indicated, a constant thrust compression is not essential, though preferable. It will be sufficient generally if the different high pressure zones or stage groups are constructed to approximate the relation expressed by the guide formulæ given above, so long as the upper and lower limits of fluid velocities and thrust compressions defined above are heeded in the construction.

My invention is particularly applicable to turbines of the disc wheel type, and by disc wheel type I mean a turbine in which the impulse characteristics predominate over the reaction characteristics. Such a turbine when constructed according to the principles set forth above not only possesses marked thermo-dynamic efficiency due to the reduced elastic fluid velocities and thrust compression losses in the high pressure part of the turbine, but by selecting and constructing the turbine for the thrust compressions and fluid velocities of the favorable order of magnitude coming within the efficiency and economy zone defined, namely above the minimum practical limits, a thoroughly economical and practical construction is effected notwithstanding the multiplication of the stages with the attendant increase in length and weight. As above indicated the fluid velocities may be reduced and the stages multiplied in the high pressure part of the turbine without unduly increasing the bulk and weight of the turbine in view of the low specific volume of the high pressure steam being dealt with.

Having thus described my invention, what I claim and desire to protect by Letters Patent is:

1. A high pressure multistage steam turbine of the disc wheel low velocity type having its guide channels constructed and proportioned with reference to each other and the steam pressure in each turbine part for fluid velocities according to the formula $$V = 114 - \frac{48p}{100}$$

where V is the relative steam velocity in meters per second and $p$ is the steam pressure in atmospheres.

2. A high pressure multistage steam turbine of the disc wheel full admission type in which the channels through which the driving fluid flows are of a construction to give a decreasing relative steam velocity from the low pressure end to the high pressure end and in which the relative steam velocity in any high pressure stage is below that defined by the formula $$V = 159 - \frac{64p}{100}$$

thereby obtaining substantially thrustless steam expansion and working.

3. A high pressure multistage elastic fluid turbine of the disc wheel type with admission pressures above 30 atmospheres in which the relative steam velocity in any stage thereof does not exceed the value corresponding to the pressure-velocity formula $$V = 114 - \frac{48p}{100},$$

wherein V is the relative steam velocity in meters per second and $p$ is the steam pressure in atmospheres, thereby obtaining practically thrustless expansion throughout the high pressure portion of the turbine.

4. A high pressure multistage elastic fluid turbine of the disc wheel type with admission pressures above 30 atmospheres in which the relative velocities through the high pressure stages thereof are determined by a curve plotted between pressure and velocity according to the formula $$V = 114 - \frac{48p}{100}$$

wherein V is the relative steam velocity in meters per second and $p$ is the steam pressure in atmospheres whereby a practically thrustless expansion and working of the steam is secured notwithstanding the high pressure.

5. A high pressure multistage steam turbine of the disc wheel type with admission pressure over 30 atmospheres in which the ratio of any intermediate guide channel section to the next preceding bears a predetermined proportionate relation to the ratio of the next succeeding channel section to the intermediate section which is less than unity and greater than 0.99.

6. A high pressure multistage steam turbine of the disc wheel type in which the ratio of an intermediate guide channel exit section to the next preceding is substantially 0.997 times the ratio of the next succeeding section to the intermediate section.

7. A high pressure multistage elastic fluid turbine of the disc wheel low fluid velocity type having its steam flow canals of such construction that the relative steam velocity in any stage thereof is less than that defined by the pressure velocity formula $$V = 159 - \frac{64p}{100}.$$

8. A high pressure multistage steam turbine of the disc wheel type having the guide openings of such relative sizes that a relative steam velocity of less than 140 meters per second will result throughout the turbine, the ratios of the successive guide openings in the higher pressure stages of the turbine closely approaching unity.

9. A multistage steam turbine of the disc wheel type having stages designed for pressures exceeding 30 atmospheres, the nozzle openings of such stages having size ratios predetermined with relation to the pressures for which the stages are designed to give decreasing relative steam velocities in the higher pressure stages generally corresponding to a change from about 90–100 meters per second in a thirty atmosphere stage to about 60–70 meters per second in a 100 atmosphere stage.

10. A high pressure multistage elastic fluid turbine of the disc wheel low fluid velocity type having its steam flow canals of such construction that the relative steam velocity in any stage thereof is less than that defined by the pressure velocity formula $$V = 159 - \frac{64p}{100}$$

and more than that represented by the formula $$59 - \frac{27p}{100}.$$

11. A high pressure multistage elastic fluid turbine of the disc wheel low fluid velocity type having its steam flow canals of such construction that the relative steam velocity in any stage thereof is less than that defined by the pressure velocity formula $$V = 159 - \frac{64p}{100}$$

and more than that represented by the formula $$59 - \frac{27p}{100},$$

the relative velocities at the higher pressure end of the turbine more closely approaching the second of said formulæ and those at the lower pressure end of the turbine more closely approaching the first of said formulæ.

In testimony whereof, I have signed my name to this specification.

FRANZ LÖSEL.